United States Patent
Schmidt et al.

(10) Patent No.: US 12,313,778 B2
(45) Date of Patent: May 27, 2025

(54) VEHICLE WINDOW WITH INTEGRATED SENSOR MODULE

(71) Applicant: FREEGLASS GmbH & Co. KG, Schwaikheim (DE)

(72) Inventors: Sebastian Schmidt, Stuttgart (DE); Laurent Friocourt, Stuttgart (DE); Uwe Weissenberger, Würzburg (DE); Luc-Henry Blanche, Hagen (DE)

(73) Assignee: FREEGLASS GmbH & Co. KG, Schwaikheim (DE)

( * ) Notice: Subject to any disclaimer, the term of this patent is extended or adjusted under 35 U.S.C. 154(b) by 1049 days.

(21) Appl. No.: 17/284,983

(22) PCT Filed: Jan. 10, 2020

(86) PCT No.: PCT/EP2020/050534
§ 371 (c)(1),
(2) Date: Apr. 13, 2021

(87) PCT Pub. No.: WO2020/148185
PCT Pub. Date: Jul. 23, 2020

(65) Prior Publication Data
US 2021/0293933 A1    Sep. 23, 2021

(30) Foreign Application Priority Data
Jan. 15, 2019 (EP) ..................... 19151818

(51) Int. Cl.
*G01S 7/481* (2006.01)
*B60R 11/00* (2006.01)
(Continued)

(52) U.S. Cl.
CPC ............ *G01S 7/4813* (2013.01); *B60R 11/00* (2013.01); *B61D 49/00* (2013.01); *G01S 17/931* (2020.01); *B60R 2011/0026* (2013.01)

(58) Field of Classification Search
CPC ......... G01S 2013/93276; G01S 13/931; G01S 17/931; G01S 7/4813; B60R 11/04
See application file for complete search history.

(56) References Cited

U.S. PATENT DOCUMENTS 7,553,536 B1   6/2009  Naoumenko et al.
2011/0285576 A1* 11/2011 Lynam ................... G08G 1/166
                                                     701/93
(Continued)

FOREIGN PATENT DOCUMENTS

CH          592 801 A5    11/1977
CN      CN 107645989 A     1/2018
(Continued)

OTHER PUBLICATIONS

International Search Report as issued in International Patent Application No. PCT/EP2020/050534, dated Apr. 15, 2020.

*Primary Examiner* — Hovhannes Baghdasaryan
*Assistant Examiner* — Clara G Ch
(74) *Attorney, Agent, or Firm* — Jason H. Vick; Amped IP LLC

(57) ABSTRACT

A vehicle window with an integrated sensor module, includes a pane main body having a cutout, a sensor module designed as a prefabricated assembly with a module housing, which forms a hollow space, in which at least one sensor is accommodated, wherein the module housing forming the hollow space is inserted into the cutout and is fastened on the pane main body, wherein, together, an outer surface of the module housing and an outer surface of the pane main body form an outer surface of the vehicle window.

20 Claims, 12 Drawing Sheets

Figure 1:
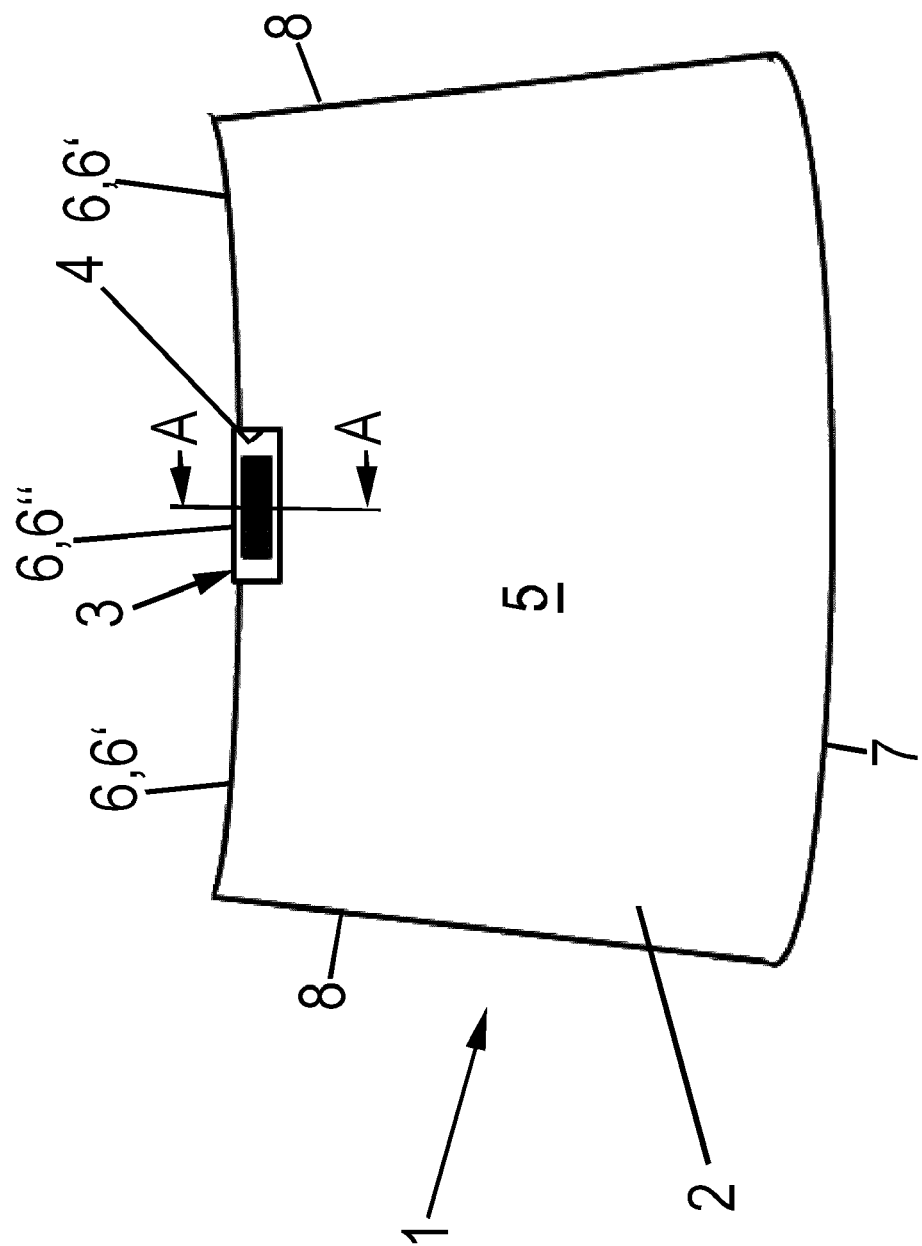

(51) Int. Cl.
*B61D 49/00* (2006.01)
*G01S 17/931* (2020.01)

(56) References Cited

U.S. PATENT DOCUMENTS

2017/0274832 A1    9/2017  Abe
2018/0037267 A1*   2/2018  Williams .............. G01S 7/4813

FOREIGN PATENT DOCUMENTS

| DE | DR DE 100 37 217 A1 | 2/2002 | |
|----|----|----|----|
| EP | 2 325 002 A1 | 5/2011 | |
| JP | 2017-181480 A | 10/2017 | |
| JP | 2017-196990 A | 11/2017 | |
| JP | 2018-196012 A | 12/2018 | |
| WO | WO-2017188415 A1 * | 11/2017 | ....... B32B 17/10036 |
| WO | WO 2018/073528 A1 | 4/2018 | |

* cited by examiner

VEHICLE WINDOW WITH INTEGRATED SENSOR MODULE

CROSS-REFERENCE TO RELATED APPLICATIONS

This application is the U.S. National Stage of PCT/EP2020/050534, filed Jan. 10, 2020, which in turn claims priority to European patent application number 19151818.2 filed Jan. 15, 2019. The content of these applications are incorporated herein by reference in their entireties.

The invention is in the technical area of window manufacture and relates to a vehicle window with an integrated sensor module and a method for its production.

Modern vehicles are usually equipped with sensors for traffic monitoring, which, for example, recognize road signs or the position and speed of objects outside the vehicle, such as other road users or obstacles in the road. Currently, primarily optical cameras or radar systems are used for this purpose. The use of cameras has the disadvantage that the object recognition is highly dependent on external environmental influences, in particular the prevailing light and weather conditions in each case. The use of radar systems for traffic monitoring is virtually independent of light and weather conditions; however, the precision of radar systems is currently insufficient for proper object recognition. In this respect, LiDaR (light detection and ranging) systems, in which the surroundings are scanned point-wise using laser pulses with a wavelength in the infrared range and an image of the surroundings is created, have proved advantageous. The distance to an object is determined by measurement of the transit time of the laser pulse emitted by the LiDaR sensor and reflected by the object. Due to the high precision in object recognition and the low dependence on light and weather conditions, LiDaR systems are well suited to supplement existing sensor systems.

Typically, sensors for traffic monitoring are arranged in the interior of the vehicle, usually behind the windshield. Alternatively, it is conceivable to accommodate the sensors in a separate sensor housing, which is then mounted on the vehicle from the outside. However, both interior installation behind the windshield and exterior mounting in a separate sensor housing entail significant disadvantages. Thus, in particular with LiDaR sensors, due to the inclination of the windshield relative to the road, the laser pulses must pass through the windshield at a very flat angle, resulting in relatively high deflection, scattering, and absorption of the photons emitted and reflected. Since a non-negligible share of the photons is lost for the measurement, the performance and efficiency of the LiDaR system is negatively affected. Although this can be avoided by an externally mounted sensor, this interferes with the design of the vehicle since, until now, it has not been possible to integrate the sensor housing smoothly and inconspicuously into the external appearance of the vehicle.

US 2017/0274832 A1 discloses a windshield with a radar window provided in a cutout. A sensor housing is fastened behind the windshield by interior mounting. US 2011/0285576 A1 discloses a windshield with a cutout closed by a cover. A sensor is accommodated in a windshield electronics module behind the windshield. These documents do not disclose a sensor module, which is a prefabricated assembly.

Consequently, the object of the present invention is to avoid the disadvantages of the prior art and to enable the use of sensors, in particular LiDaR sensors, without substantial disadvantages in terms of their performance and efficiency as well as the design of the vehicle. These and other objects are accomplished according to the proposal of the invention by a vehicle window having an integrated sensor module in accordance with the independent claim. Advantageous embodiments of the invention are apparent from the dependent claims.

According to the invention, a vehicle window having an integrated sensor module is presented. The vehicle window includes a pane main body with a cutout. The cutout in the pane main body can be implemented at the edge or not at the edge, i.e., in an (inner) region of the pane main body not situated at the edge of the pane main body. The vehicle window further includes a sensor module with a module housing, which forms a hollow space in which at least one sensor is accommodated. Preferably, the module housing is a closed module housing that completely surrounds the hollow space. The module housing forming the hollow space is inserted into the cutout of the pane main body and fastened on the pane main body. Together, an outer surface of the module housing and an outer surface of the pane main body form an outer surface of the vehicle window. The sensor module is a prefabricated assembly with a module housing surrounding a hollow space, which assembly can be integrated into the pane main body. The module housing is thus formed neither by the pane main body nor by components of the vehicle other than the vehicle window. The module housing directly surrounds or delimits the hollow space. Since the sensor module is a prefabricated assembly (i.e., a module), the at least one sensor is also fastened on the vehicle window by the fastening of the module housing on the pane main body. The module housing has a static load-bearing function and allows the passage of sensors signals. The sensor module can be installed independently in the vehicle window as a prefabricated assembly, with fastening of the sensor module, for example, exclusively on the pane main body. Also possible is fastening only to the pane main body and additionally to the supporting structure of the vehicle, in particular to the vehicle roof. In any case, the sensor module comprising the module housing forming the hollow space and at least one sensor in the module hollow space is not actually formed on the vehicle window but, instead, is already present as an independent assembly before mounting on the vehicle window or before mounting on the pane main body. In any case, the at least one sensor is not fastened separately on the vehicle or other components of the vehicle; instead, fastening of the at least one sensor on the vehicle window is done exclusively by fastening the sensor module formed as a prefabricated assembly on the pane main body (and, possibly, additionally, on the supporting structure of the vehicle).

Due to integration of the sensor module into the vehicle window, the vehicle window according to the invention advantageously enables the use of sensors, in particular LiDaR sensors, with high efficiency without adversely affecting the external appearance of the vehicle. The vehicle window according to the invention can be any stationary window in the vehicle. Use as a windshield is particularly advantageous.

In order to achieve particularly high efficiency of the at least one sensor, in particular of a LiDaR sensors, the module housing has a bulge (i.e., a curved, non-planar region) shaped such that a housing section of the housing module is situated in the field of view (beam path) of the sensor, which the sensor signal (e.g., laser pulse) strikes with a deviation of a maximum of 10° from the perpendicular. Preferably, the sensor signal strikes the housing section of the module housing in the field of view of the sensor perpendicularly. This can significantly reduce the disadvantageous effects mentioned in the introduction (deflection, scattering, and absorption of photons). The module housing is, for example, bulged perpendicular to a plane of the pane main body, in particular perpendicular to a plane tangential to the pane main body in the region of the cutout in which the sensor module is inserted. In the installed state, the bulge is directed away from the vehicle interior. Relative to a direction from a lower edge of the pane main body (in the installed state) to an upper edge of the pane main body, the module housing has a housing section that moves away from the (possibly tangential) plane of the pane main body as well as a housing section adjacent thereto that approaches the plane of the pane main body. The bulge is preferably implemented such that, in the installed state of the vehicle window, the field of view (beam path) of the sensor is aimed parallel to the longitudinal direction of the vehicle (i.e., parallel to the vehicle's direction of travel and/or the opposite direction). The bulge is formed by a housing section of the module housing forming the outer surface of the vehicle window. In the region of the bulge, the module housing is curved, i.e., if the module housing is made up of multiple components, all components form the bulge and are thus curved. Advantageously, the sensor is arranged at least partially within the bulge such that the sensor signals emitted by the sensor can directly strike the housing section of the module housing forming the bulge or reflected signals can be received by the sensor.

The module housing can be implemented in one or more parts. Advantageously, the module housing is implemented in multiple parts and has a cover forming the outer surface of the module housing and a base attached to the cover, which, together, directly delimit the hollow space for the sensor. Preferably, the base is fastened only to the cover. Preferably, the base and cover form a closed module housing that completely (directly) delimits the hollow space. The base preferably serves for load-bearing fastening of the at least one sensor. Viewed perpendicularly through a plane of the pane main body, in particular a tangential plane on the pane main body in the region of the cutout, the base is preferably situated within the dimensions of the cover, i.e., the cover protrudes relative to the base and thus has an overhang, which can advantageously be used for fastening the module housing on the pane main body. A bulge of the module housing is formed by the cover. Advantageously, the cover is designed in one piece and is made of a single material. Advantageously, the cover is composed of two components and is made of two different materials. Advantageously, the base is designed in one piece and is made of a single material.

The pane main body is advantageously a glass pane main body. According to one embodiment, the pane main body is implemented in the form of a composite pane and comprises at least one outer pane and one inner pane, fixedly joined to one another via at least one thermoplastic intermediate layer. Windshields are typically composite panes. Alternatively, the pane main body can be a single pane (single-pane safety glass). Rear windows, roof panels, or side windows are typically implemented as single-pane safety glass (ESG). Depending on the use of the vehicle window, the pane main body can be designed appropriately.

The one or more panes of the pane main body contain or are made of glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof. Preferably, the pane main body is made of glass. The pane main body is preferably transparent, in particular for use of the vehicle window as a windshield or rear window of a vehicle or other uses in which high light transmittance is desired. In the context of the invention, "transparent" means having transmittance in the visible spectral range of more than 70%. For vehicle windows that are not positioned in the driver's field of vision, for example, roof panels, the transmittance can also be much lower, for example, greater than 5%. The pane main body can be colorless or colored. Preferably, the panes of the pane main body are made of thermally toughened soda lime glass.

The thickness of the pane main body can vary widely and be adapted to the requirements of the individual case. Preferably, pane main bodies with the standard thicknesses of 1.0 mm to 25 mm are used. The size of the pane main body can vary widely and is governed by the size of the application of the vehicle window. The size of the vehicle window is determined by the size of the pane main body.

The pane main body can have any three-dimensional shape. The pane main body can be planar or slightly or strongly curved in one or more spatial directions.

In the case of a pane main body that is implemented as a composite pane, the individual panes are joined to one another via at least one intermediate layer containing or made of at least one thermoplastic material, preferably polyvinyl butyral (PVB), ethylene vinyl acetate (EVA), and/or polyethylene terephthalate (PET). However, the thermoplastic intermediate layer can also contain, for example, polyurethane (PU), polypropylene (PP), polyacrylate, polyethylene (PE), polycarbonate (PC), polymethyl methacrylate, polyvinyl chloride, polyacetate resin, casting resin, acrylate, fluorinated ethylene-propylene, polyvinyl fluoride, and/or ethylene tetrafluoroethylene, or a copolymer or mixtures thereof. The thermoplastic intermediate layer can be formed by one or a plurality of thermoplastic films arranged one above another.

The module housing contains or is made of one or plurality of plastics. The module housing preferably contains or is made of polycarbonate (PC), polymethyl methacrylate (PMMA), styrene acrylonitrile (SAN), and/or copolymers, block copolymers, or mixtures thereof. In the case of a glass pane main body, the vehicle window according to the invention thus has a glass/plastic material combination.

In an advantageous embodiment of the invention, the cover of the module housing is formed in two parts and has an outer part as well as an inner part in the form of an inner lining of the outer part, wherein the outer part and the inner part are made of materials different from one another. In addition, the inner part has a opening (aperture) situated in the field of view of the sensor that constitutes a window for the sensor signals of the sensor. As a result of this measure, the cover can, on the one hand, be very stable mechanically and, on the other, be highly permeable to the sensor signals, by selecting the materials of the outer part and the inner part such that the outer part has high permeability to sensor signals and the material of the inner part provides the cover with high mechanical stability. For example, the outer part in the inner part are each made of a single material.

For example, the outer part of the cover contains or is made of polycarbonate (PC), polyethylene (PE), polymethyl methacrylate (PMMA), propylene (PP), polystyrene, polybutadiene, polynitrile, polyester, polyurethane, polyacrylate, polyamide, polyethylene terephthalate (PET), polybutylene terephthalate (PBT), preferably acrylonitrile butadiene styrene (ABS), acrylonitrile styrene acrylester (ASA), acrylonitrile butadiene styrene polycarbonate (ABS+PC), PET+PC, PBT+PC, and/or copolymers, block copolymers, or mixtures thereof. The inner part of the cover contains or is made of, for example, polycarbonate (PC), polyethylene (PE), polymethyl methacrylate (PMMA), polypropylene (PP), polystyrene, polybutadiene, polynitrile, polyester, polyurethane, polyacrylate, polyamide, polyethylene terephthalate (PET), polybutylene terephthalate (PBT), preferably acrylonitrile butadiene styrene (ABS), acrylonitrile styrene acrylester (ASA), acrylonitrile butadiene styrene polycarbonate (ABS+PC), PET+PC, PBT+PC, and/or copolymers, block copolymers, or mixtures thereof. The inner part can, in addition, contain inorganic or organic fillers, preferably $SiO_2$, $Al_2O_3$, $TiO_2$, clay minerals, silicates, zeolites, glass fibers, carbon fibers, glass beads, organic fibers, and/or mixtures thereof. The fillers can further increase the stability of the cover. In addition, the fillers can reduce the polymeric material content and thus reduce the manufacturing costs of the sensor module.

The material thickness of the outer part is, for example, in the range from 2 to 4 mm, preferably 2.5 to 3.5 mm. The material thickness of the inner part is, for example, in the range from 1 to 3 mm, preferably 1.5 to 2.5 mm.

For example, the module housing comprises a cover with an outer part made of polycarbonate (PC) and an inner part made of a polymer such as acrylonitrile butadiene styrene polycarbonate (ABS+PC) or PET+PC. Such a cover is, on the one hand, very stable mechanically; on the other, it has, in the region of the field of view of the sensor, where the material of the inner part is cut out and only the outer part made of PC is present (window), very high transmittance for IR laser pulses of a LiDaR sensor. As experiments by the inventors revealed, PC has transmittance of at least 80% for IR laser pulses. The PC material of the cover is preferably black/opaque such that the LiDAR sensor is optically concealed or not visible to the human eye, but can operate in the wavelength range of the IR laser pulses.

The cover can also be implemented in one piece and contain or be made of materials as used for the other parts. In order to achieve good transmittance for the sensor signals of the sensor, it can be advantageous for the cover to have a thinner wall thickness in the field of view of the sensor than outside the field of view of the sensor.

In another embodiment of the vehicle window according to the invention, the cover of the module housing is lengthened and designed in the form of a roof rim extending into the vehicle roof in the installed state. The roof rim can, for example, be strip-shaped in the longitudinal direction of the vehicle or T-shaped. This enables a visually quite appealing incorporation of the sensor module integrated into the vehicle window into the vehicle.

In the case of a pane main body implemented in the form of a composite pane, it is advantageous for the outer pane to be set back relative to the inner pane adjacent the cutout such that the inner pane forms a support surface accessible from above on which the module housing of the sensor module is fastened. This measure enables a particularly firm bonding of the module housing to the pane main body and, at the same time, an aesthetically/aerodynamically good integration of the sensor module in the pane main body.

In the case of a pane main body implemented in the form of a single-pane safety glass, it is advantageous for the module housing to be fastened on an inner surface of the single-pane safety glass adjacent the cutout, enabling a firm and visually appealing integration of the sensor module.

Preferably, an intermediate space formed between the module housing and the pane main body is at least partially, in particular completely, filled with a thermoplastic material, for example, a thermoplastic elastomer, achieving, on the one hand, a good seal against the external environment, and, on the other, making possible a considerable reduction in undesirable air noise due to airflow.

The sensor module contains at least one sensor for object recognition, which can, in principle, be designed in any way. For example, the sensor is an optical camera or a radar sensor. Preferably, it is a sensor with which the distance to an object can be determined by measuring the transit time of a sensor signal emitted by the sensor and reflected by the object. Particularly preferably, it is a LiDaR sensor, by means of which the external surroundings of the vehicle can be scanned using laser pulses in the infrared wavelength range. The LiDaR sensor emits laser pulses and detects the laser pulses reflected by an object. For example, the laser pulses have a wavelength in the wavelength range from 850 to 1100 nm. Typically, polycarbonate has high transmittance for these wavelengths of more than 80%, in particular around 90%.

The module housing of the sensor module, in particular the cover and the base, are produced by injection molding.

The module housing, in particular its part forming the outer surface of the vehicle window, in particular the cover, can be provided with a heating device including, for example, electrically heatable heating wires or an electrically heatable heating layer. To produce the cover, a film with heating wires applied thereon can be placed in an injection mold and back-injected. Advantageously, the side with the heating wires is the side onto which the material of the cover (e.g., PC) is injected. The heating wires are thus safely embedded. Alternatively, a molded part for the cover can be produced initially and the heating wires subsequently applied, for example, by ultrasonic embedding on the inner side of the molded part. Instead of heating wires, it is also possible to use a conductive transparent layer that can be deposited using a magnetron method or the like. The heating wires can, for example, be electrically contacted by opposing busbars. The busbars can be applied before or after the back injection of the film. Various technologies are available for this, such as, soldering, gluing, deposition using plasma-assisted fine powder coating, stitching, or the like.

The region of the module housing or cover facing the external environment is preferably provided with a scratch-resistant and weatherproof coating (hardcoat), for example, a single-layer or two-layer thermally cured polysiloxane system or a UV-cured acrylate system. The layer thicknesses of a single-layer polysiloxane coating are preferably in the range from 5 μm to 20 μm. The layer thicknesses of a two-layer polysiloxane coating are preferably: primer: 0.5 μm to 5.0 μm, hardcoat: 3.5 μm to 15.0 μm.

The invention further extends to a method for producing a vehicle window according to the invention with an integrated sensor module, comprising the following steps:

Providing a pane main body having a cutout,

Inserting the sensor module designed as a prefabricated assembly into the cutout and fastening the sensor module on the pane main body.

The method according to the invention enables providing a vehicle window that can be installed in a vehicle and in which the sensor module is integrated and merely has to be connected electrically.

The invention further extends to the use of the vehicle window according to the invention in means of transportation for travel on land, in the air, or on water, preferably as a window pane in rail vehicles or motor vehicles, in particular as a windshield, rear window, side window, or roof panel of passenger cars.

The various embodiments of the invention can be implemented individually or in any combination. In particular, the features mentioned above and to be explained in the following can be used not only in the combinations indicated, but also in other combinations or in isolation, without departing from the scope of the present invention.

Figure 2:
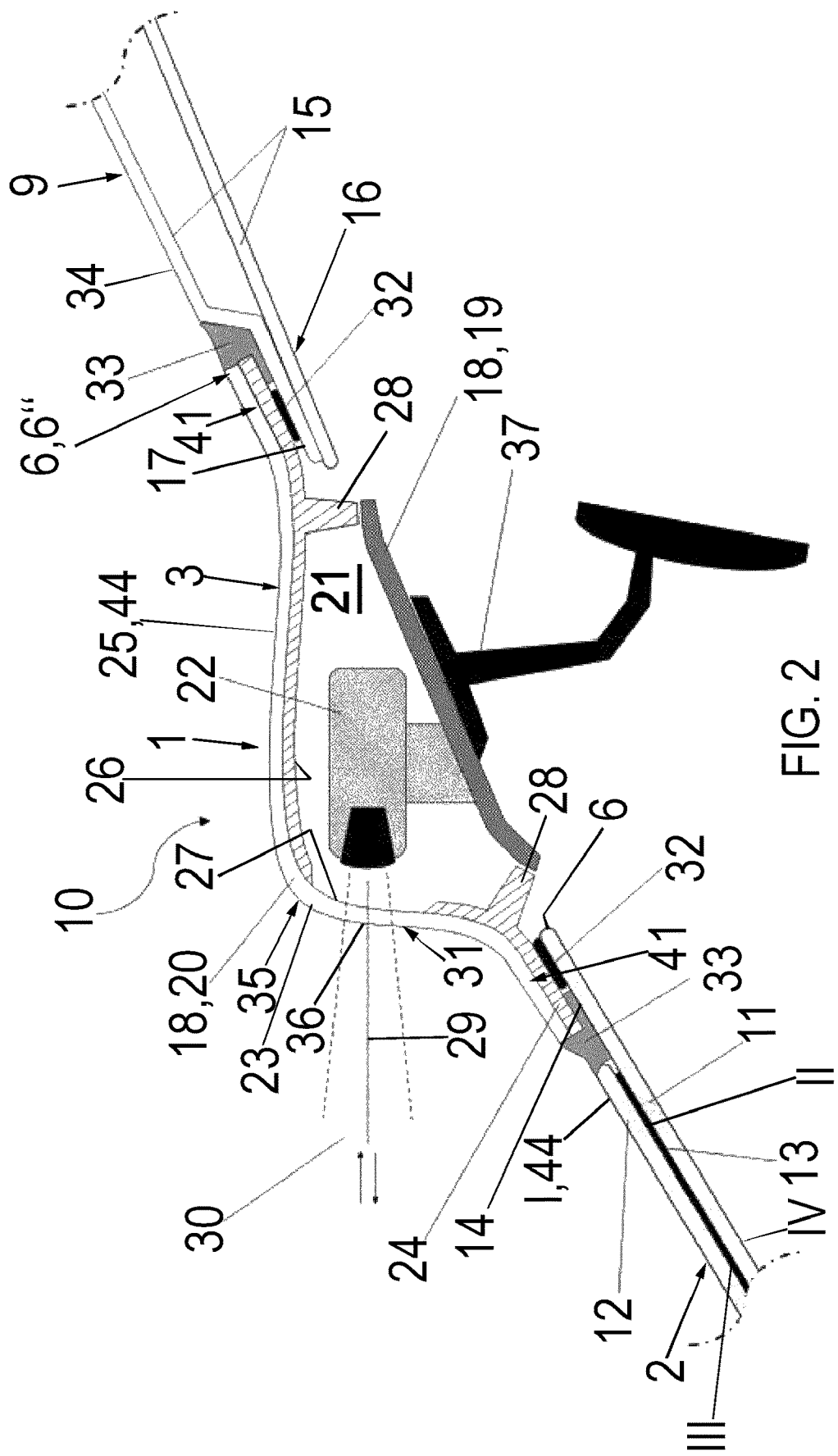
Figure 3:
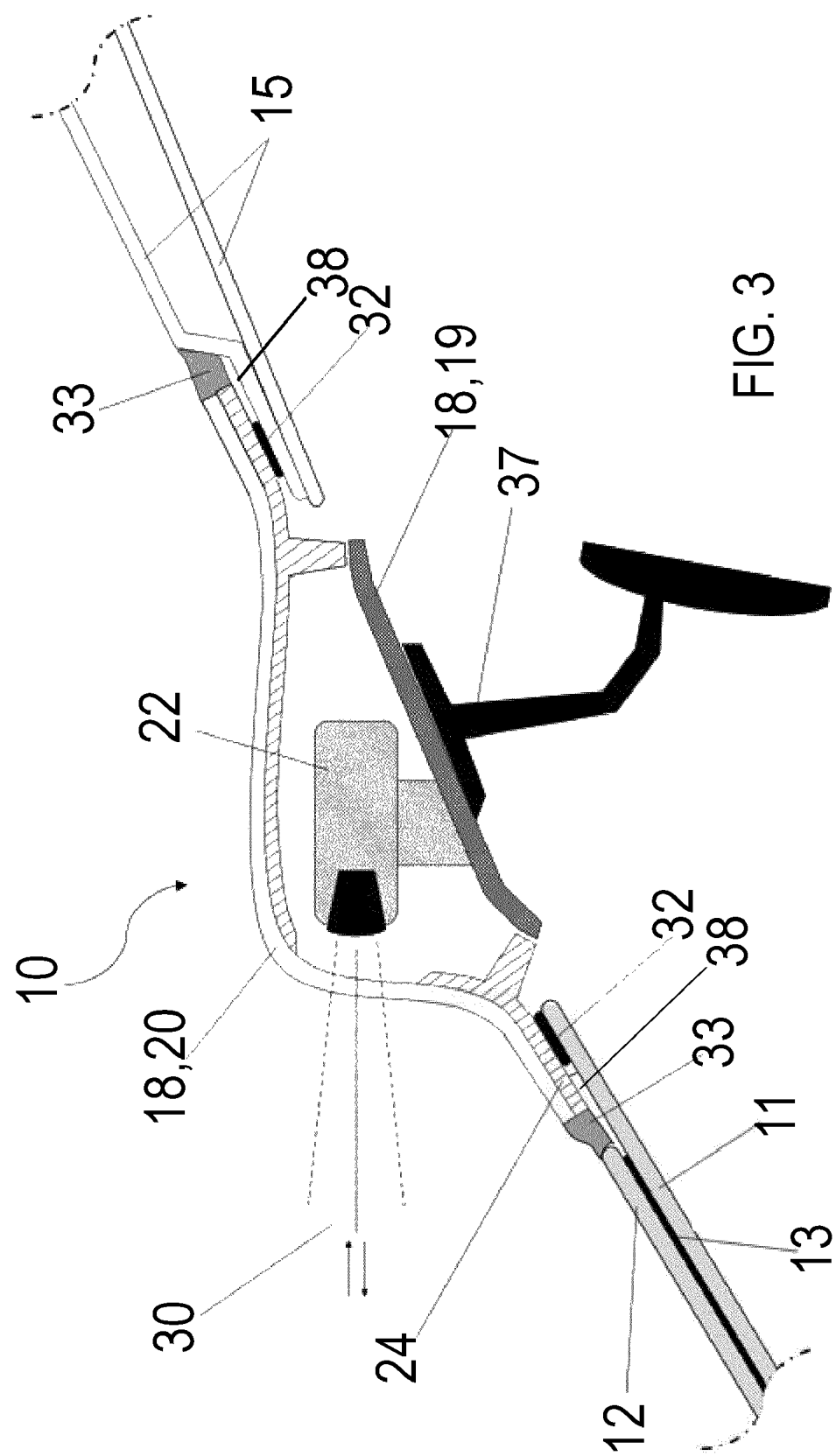
Figure 4:
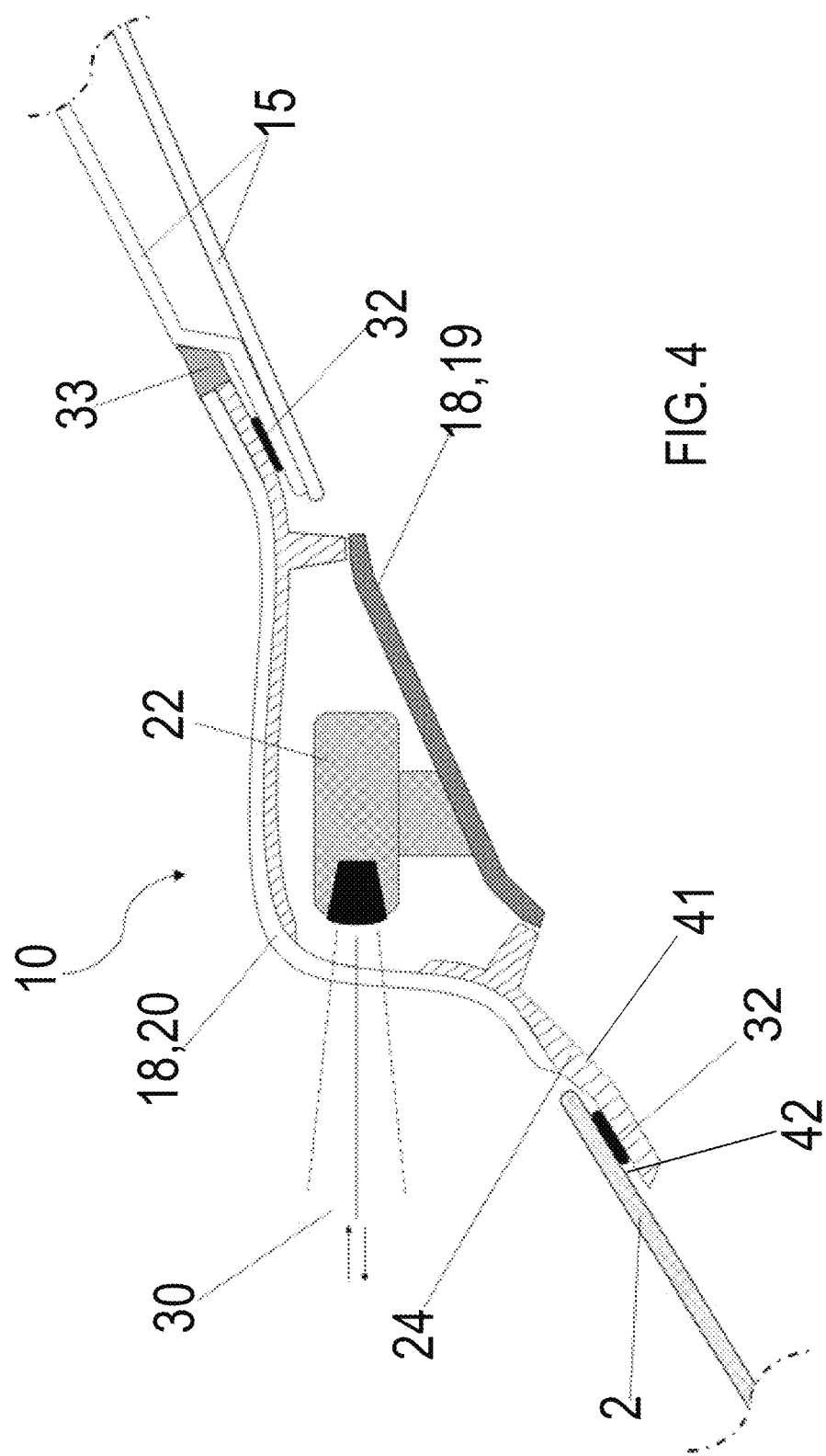
Figure 5:
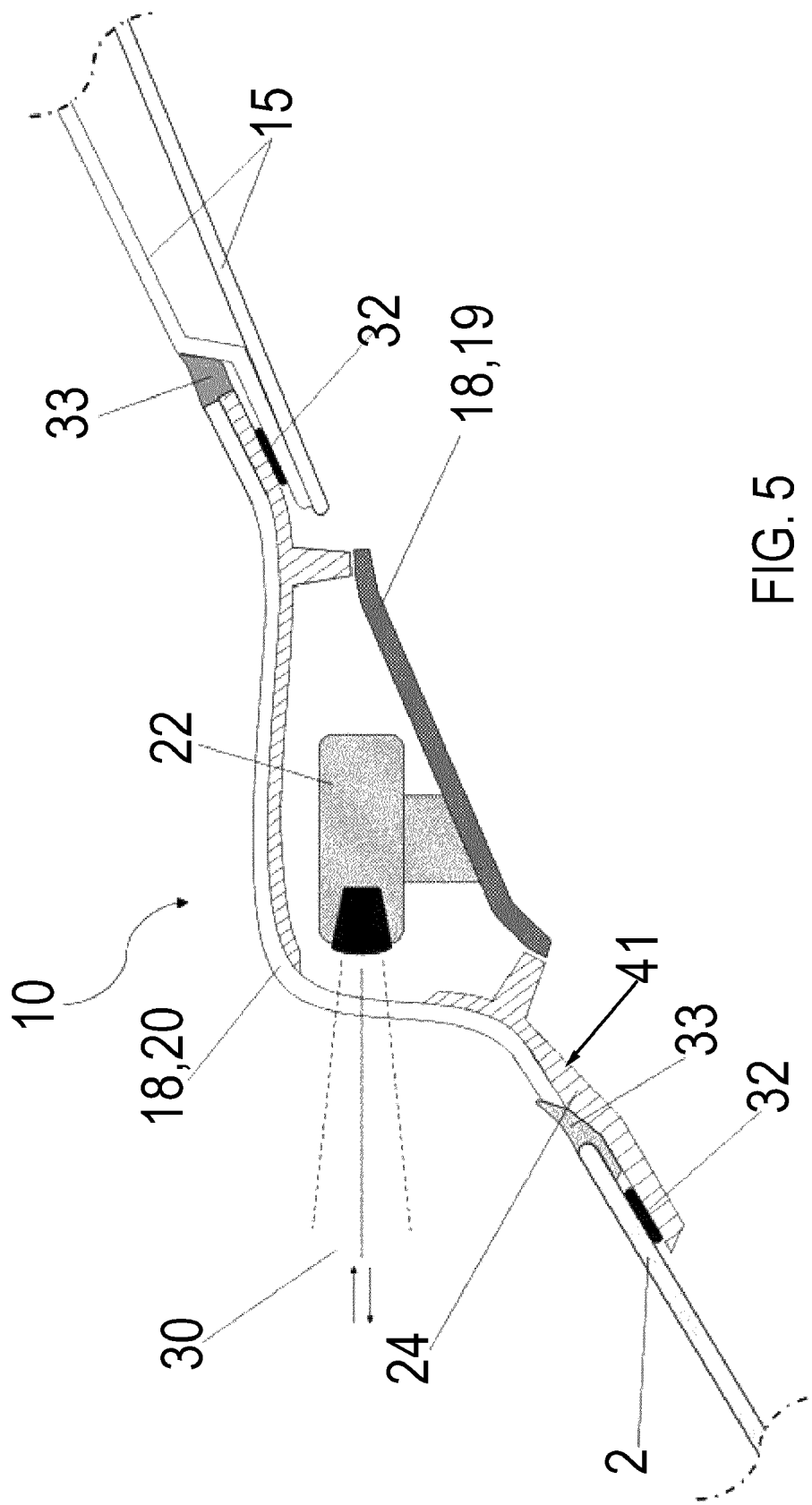
Figure 6:
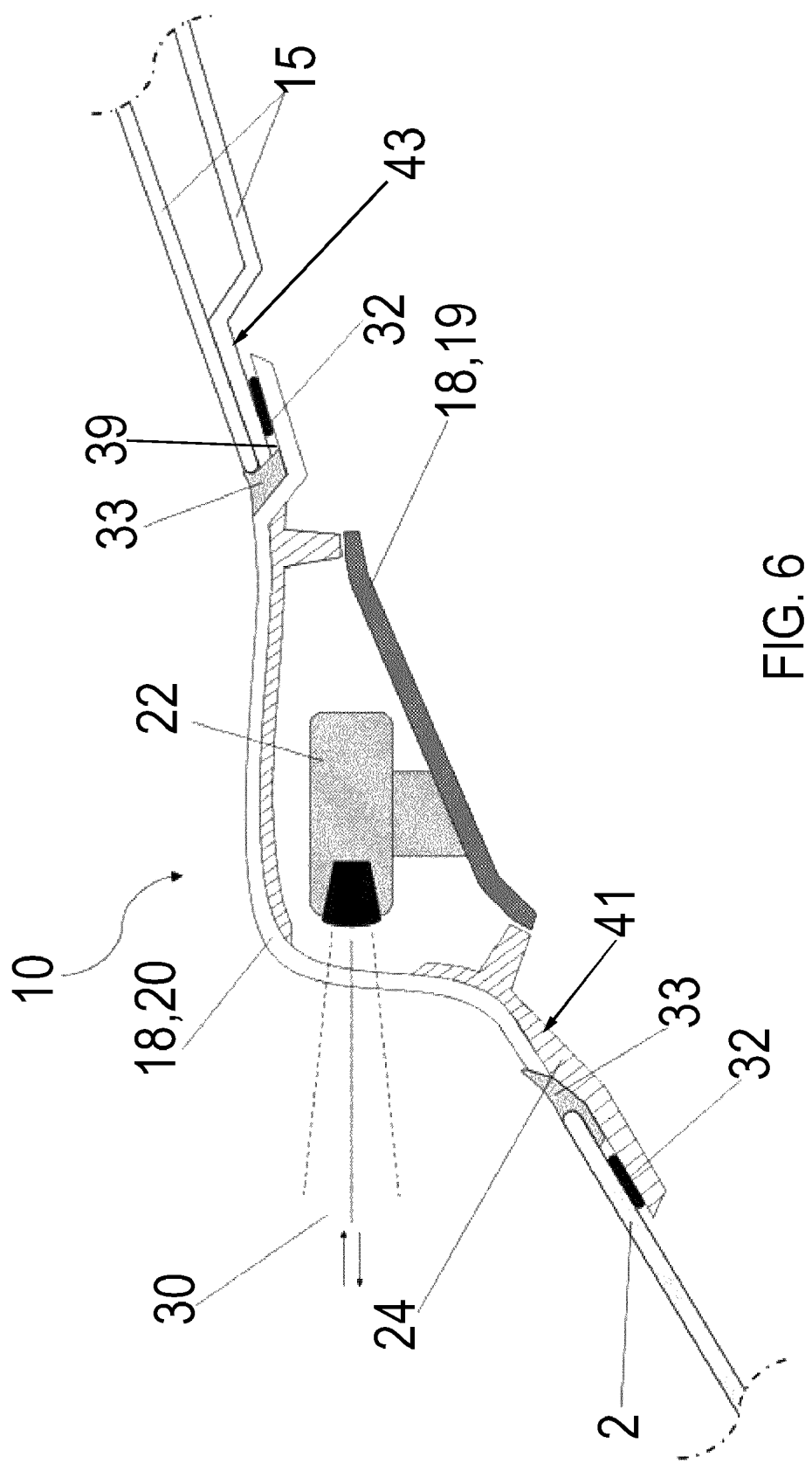
Figure 7:
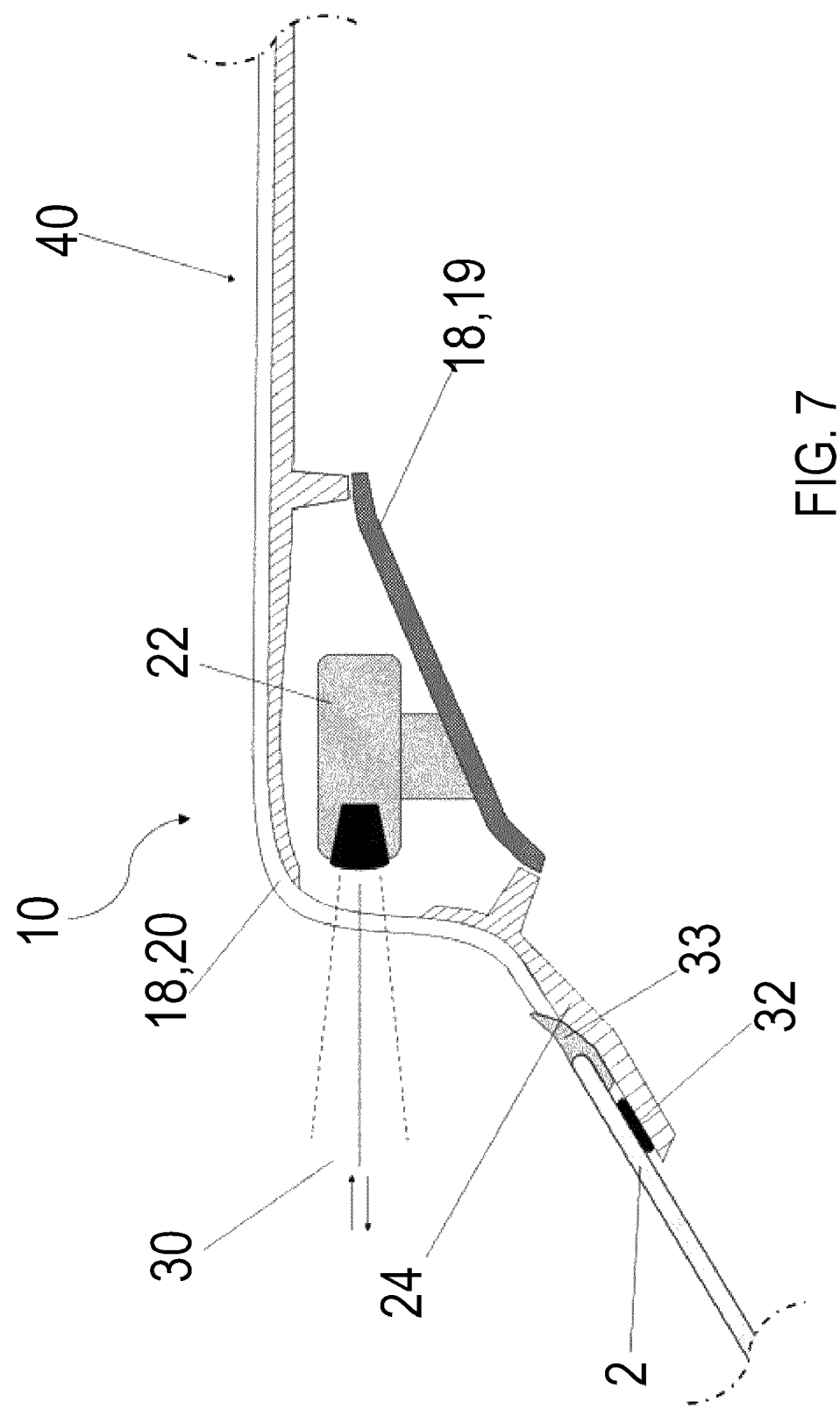
Figure 8B:
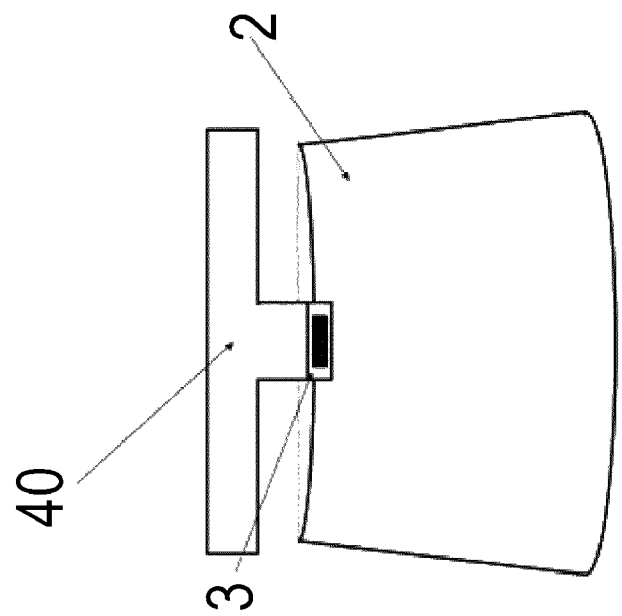
Figure 8A:
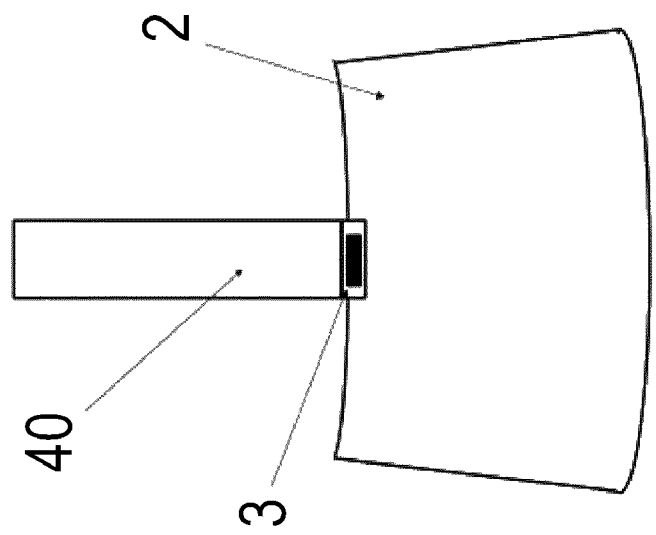
Figure 9:
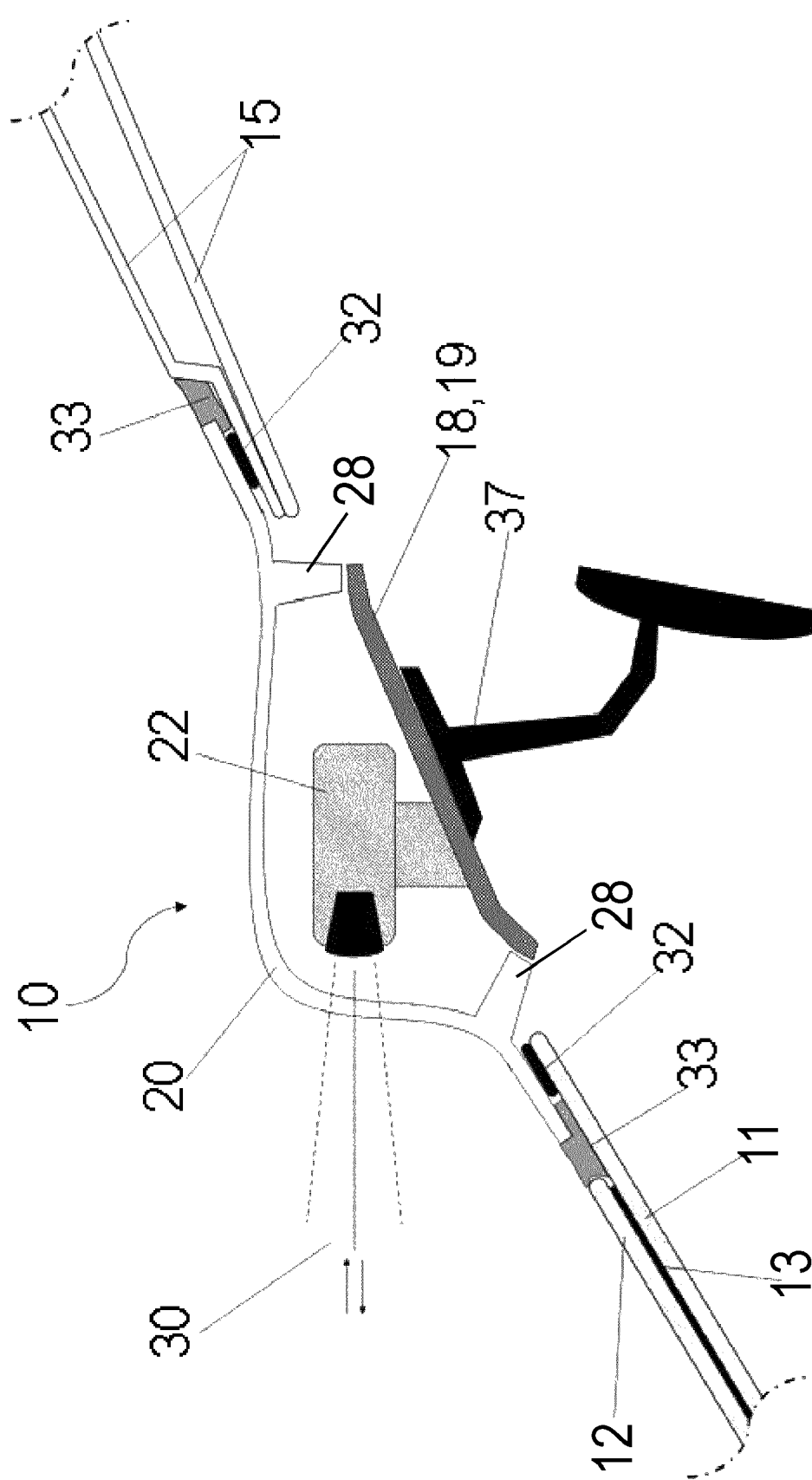
Figure 10:
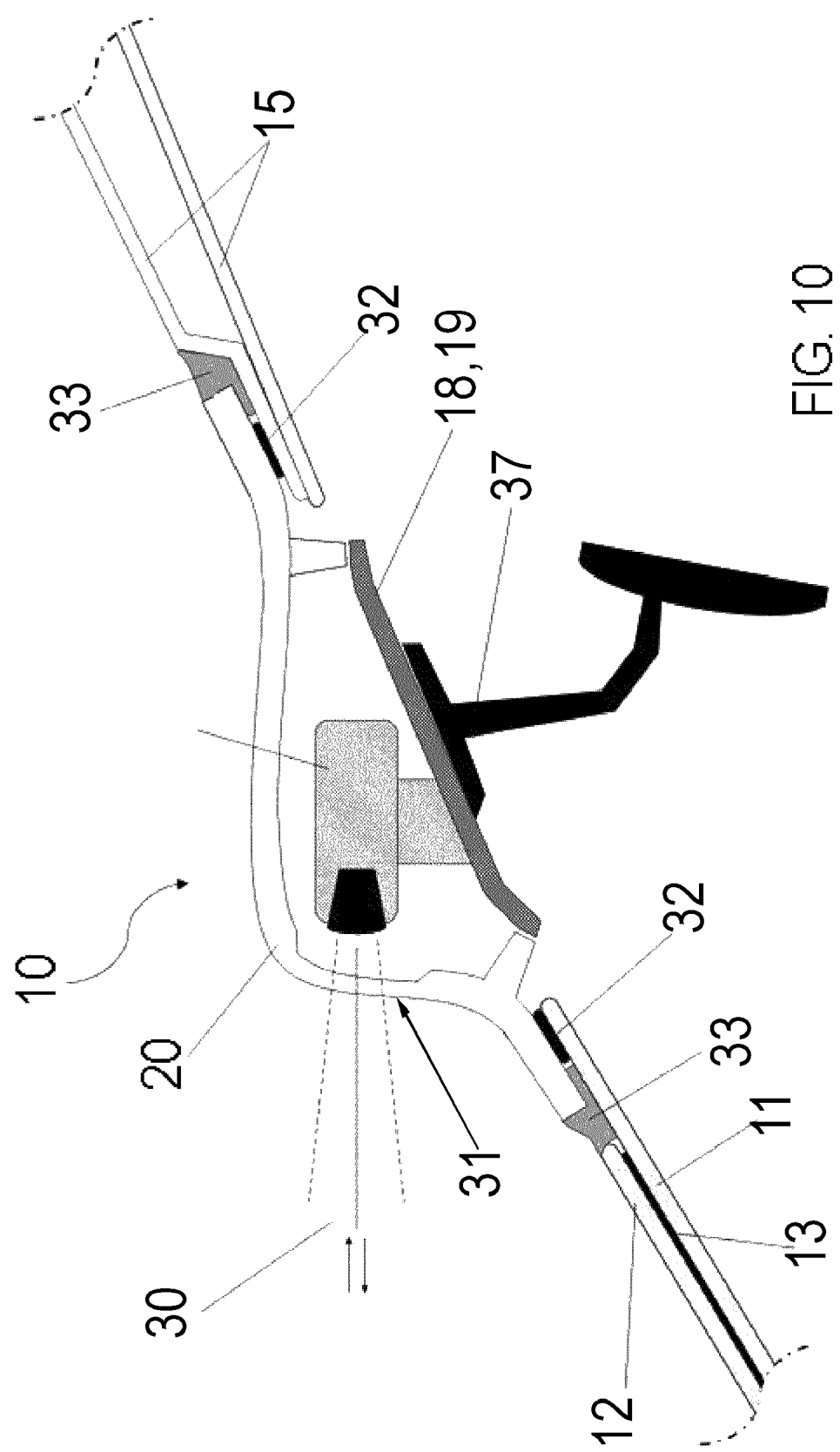
Figure 11:
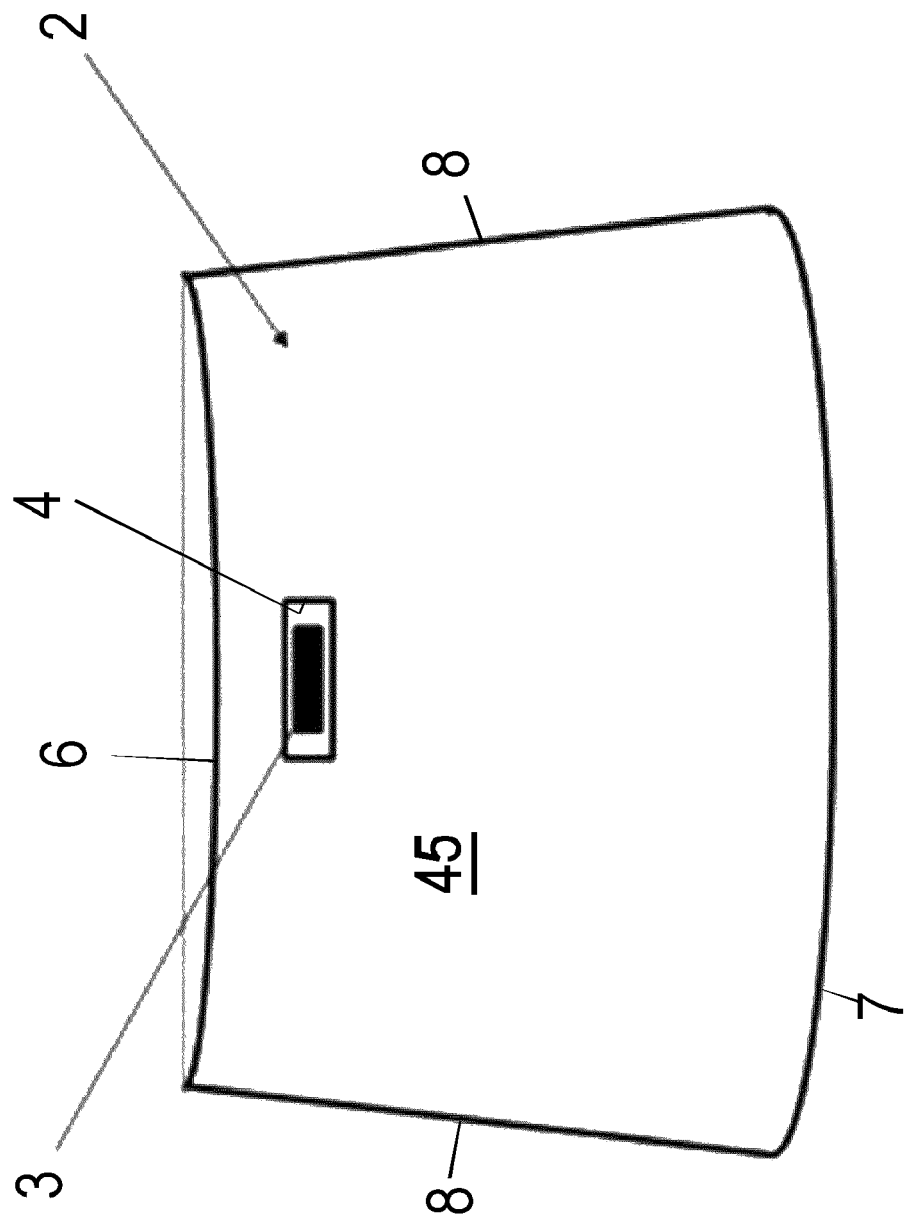
Figure 12:
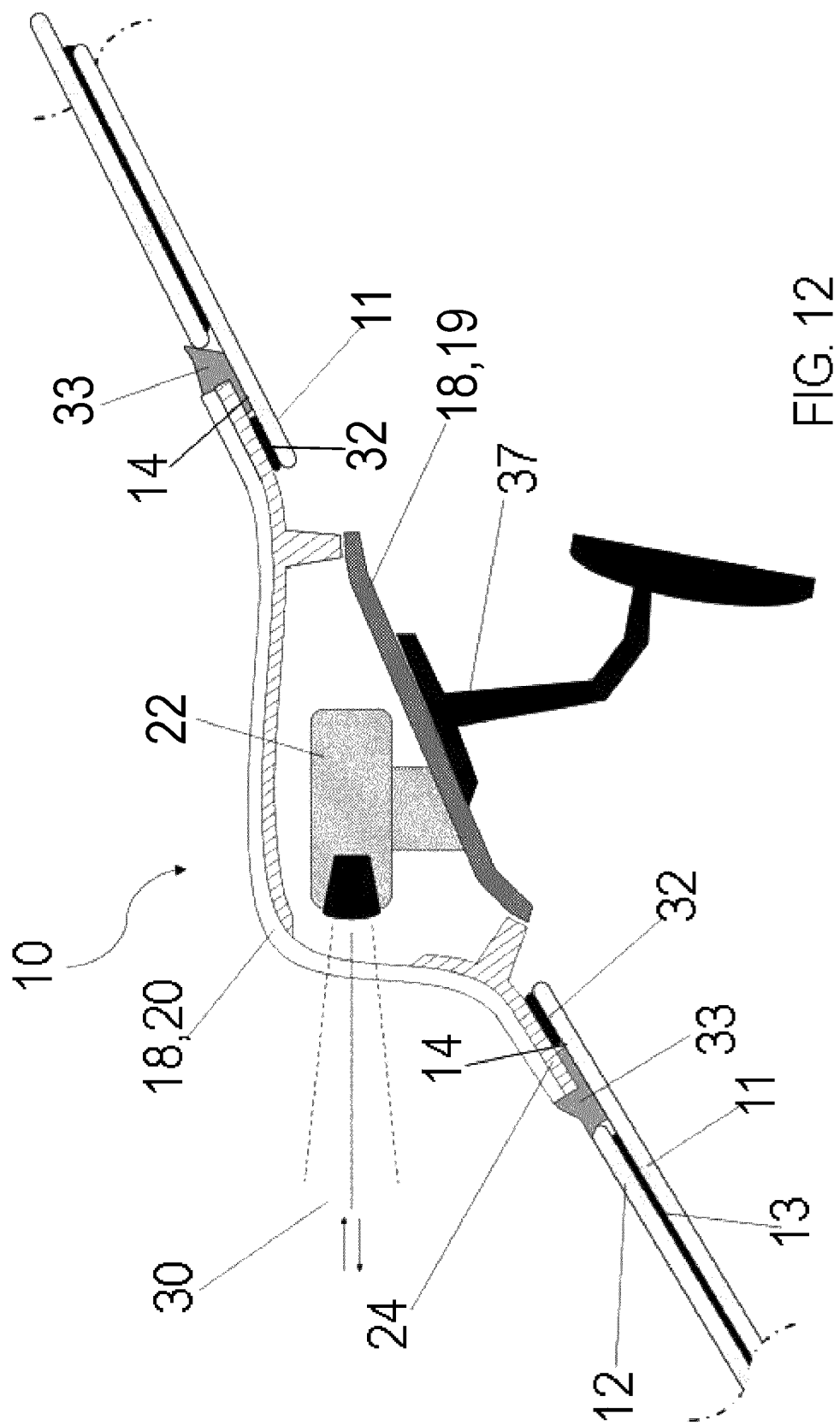

The invention is explained in detail in the following using exemplary embodiments, with reference to the accompanying figures. They depict, in simplified, not to scale representation:

FIG. 1 a schematic representation of an exemplary embodiment of the vehicle window according to the invention in top view, FIG. 2 a vehicle window assembly with the vehicle window of FIG. 1 fastened to a vehicle roof in a sectional view according to section line A-A, FIG. 3 a variant of the vehicle window assembly of FIG. 2, FIG. 4 a variant of the vehicle window assembly of FIG. 3, FIG. 5 a variant of the vehicle window assembly of FIG. 4, FIG. 6 a variant of the vehicle window assembly of FIG. 5, FIG. 7 another variant of the vehicle window assembly of FIG. 5, FIG. 8A, 8B two embodiments of the vehicle window of FIG. 7 in top view, FIG. 9 another variant of the vehicle window assembly of FIG. 2, FIG. 10 a variant of the vehicle window assembly of FIG. 9, FIG. 11 another exemplary embodiment of the vehicle window in top view, FIG. 12 a vehicle window assembly with the vehicle window of FIG. 11 fastened to a vehicle roof in a sectional view according to section line A-A.

DETAILED DESCRIPTION OF THE DRAWINGS

First, reference is made to FIGS. 1 and 2, which illustrate an exemplary embodiment of the vehicle window according to the invention with an integrated sensor module. FIG. 1 depicts, in top view, the vehicle window 1 referenced as a whole with the reference number 1. FIG. 2 is a sectional representation of the vehicle window 1 of FIG. 1 according to section line A-A, illustrating the roof-side installation of the vehicle window 1 in a motor vehicle. Together, the vehicle window 1 and the vehicle roof 9 form a vehicle window assembly 10.

Here, for example, the vehicle window 1 is implemented in the form of a windshield for a motor vehicle. As depicted in FIG. 1, the vehicle window 1 comprises a pane main body 2, in which a sensor module 3 is integrated by fixed installation. The sensor module 3 is inserted into a cutout 4 at the edge of the vehicle window 1. The cutout 4 is situated outside the central field of vision 5 roughly at the center at the roof-side windshield edge 6 of the vehicle window 1, which is situated at the top in the installed state of the vehicle window 1. In the present embodiment, the cutout 4 is rectangular, with other shapes for the cutout being equally possible depending on the outer shape of the sensor module 3, for example, a semicircular cutout. The bottom windshield edge 7 is situated opposite the roof-side windshield edge 6. The two lateral vehicle window edges 8, which are, in the installed state, typically arranged at the A pillars of a motor vehicle, are situated between the roof-side edge 6 and the bottom windshield edge 7. The roof-side windshield edge 6 of the vehicle window 1 is composed of a roof-side windshield edge 6' of the pane main body 2 and a roof-side windshield edge 6" the sensor module 3. Together, the pane main body 2 and the sensor module 3 form the vehicle window 1. The sensor module 3 can be fastened on the pane main body 2 as a prefabricated assembly.

FIG. 2 depicts the vehicle window 1 of FIG. 1 using a sectional representation, wherein the roof-side installation of the vehicle window 1 is illustrated and, supplementing FIG. 1, the vehicle roof 9 of a motor vehicle (not further shown) is depicted. The pane main body 2 and the vehicle roof 9 are in each case only partially depicted, as is discernible from the dashed lines.

Here, the pane main body 2 is a composite pane and comprises an inner pane 11 as well as an outer pane 12 that are fixedly joined (laminated) to one another via a thermoplastic intermediate layer 13. The outer pane 12 and the inner pane 11 are each made of glass, preferably thermally toughened soda lime glass and are transparent to visible light. The thermoplastic intermediate layer 13 is made of a thermoplastic material, preferably polyvinyl butyral (PVB), ethylene vinyl acetate (EVA), and/or polyethylene terephthalate (PET).

The outer surface I of the outer pane 12 faces the external environment and is, at same time, the outer surface of the pane main body 2. The inner surface II of the outer pane 12 and the outer surface III of the inner pane 11 each face the intermediate layer 13. The inner surface IV of the inner pane 11 faces the vehicle interior and is, at the same time, the inner surface of the pane main body 2.

As is discernible in FIG. 2, in the region of the cutout 4, the outer pane 12 is set back relative to the inner pane 13 such that the outer surface III of the inner pane 11 is accessible from above. In the region of the back-offset of the outer pane 12, the outer surface III of the inner pane 13 serves as a support surface 14 for the sensor module 3.

The vehicle roof 9 partially shown in FIG. 2 comprises two sheet-metal parts 15 spaced apart from one another, which are fixedly joined to one another at the pane-side edge 16, for example, by welding or riveting and, together, form a roof flange 17 for supporting the vehicle window 1. The sensor module rests against the roof flange 17 with a region adjacent the roof-side edge 6, 6" and is fastened thereto. It goes without saying that the pane main body 2 rests against the roof flange 17 with the region adjacent the roof-side edge 6, 6' in the same way and is fastened thereto.

The sensor module 3 comprises a module housing 18 composed of a base 19 and a cover 20 connected to the base 19. Together, the base 19 and the cover 20 form a preferably closed hollow space 21 for accommodating at least one sensor 22. The base 19 and cover 20 completely surround the hollow space 21 such that no further components are required to form the hollow space 21, in particular no components of the motor vehicle, such as a vehicle headliner or interior roof lining. The base 19 extends neither to the pane main body 2 nor all the way to the vehicle roof 9 and is arranged when viewed at right angles through the vehicle window 1 completely within the dimensions of the cover 20. For the above observation, for example, the view is perpendicular through a plane of the pane main body 2 (e.g., a plane tangential to the pane main body 2 in the region of the cutout 4). Consequently, the cover 20 extends beyond the base 19 (e.g., relative to the above mentioned plane tangential to the pane main body in the region of the cutout 4) such that the cover 20 protrudes relative to the base 19 and forms an overhang 41 that can be used for the fixed installation of the sensor module 3. The base 19 is fixedly connected (preferably detachably) only to the cover 20, with the base 19 having no further connection to other components of the vehicle window 1 or the motor vehicle.

Here, the cover 20 is, for example, implemented in two parts and consists of an outer part 23 and and inner part 24, which are, for example, fixedly connected to one another by 2-component injection molding/direct gating. The inner part 24 is in the form of an inner lining of the outer part 23, with a opening 27 provided, which serves as a window 31 for the sensor 22. In the present embodiment, the inner part 24 includes a projecting support 28, on which the base 19 is fastened.

The sensor module 3 is fastened (exclusively) by means of the module housing 18 (specifically by means of the cover 20) both on the pane main body 2 and on the vehicle roof 9 by gluing. For this purpose, a glue bead 32 is applied on the support surface 14 of the outer surface III of the inner pane 11 and on the roof flange 17 of the vehicle roof 9 in the region of the back-offset of the outer pane 12. The overhang 41 of the cover 20 is placed on the circumferentially formed glue bead 32, as a result of which the module housing 18 is fixedly bonded, on the one hand, to the pane main body 2 and, on the other, to the vehicle roof 9. The pane main body 2 is likewise glued to the roof flange 17 by a glue bead (not shown in FIG. 2), whereby different adhesive materials can be selected corresponding to the materials of the pane main body 2 and the cover 20 (glass/plastic).

An intermediate space between the cover 20 and the pane main body 2 or between the cover 20 and the vehicle roof 9 is filled with an overmold 33 of a thermoplastic material (e.g., thermoplastic elastomer), resulting in a good seal relative to the external environment.

The outer surface of the cover 20 facing the external environment, hereinafter referred to as "outer surface 25 of the cover", forms, together with the outer surface I of the outer pane 12 of the pane main body 2, the outer surface 44 of the vehicle window 1. The outer surface I of the outer pane 12 transitions at least virtually flush into the outer surface 25 of the cover. Likewise, the outer surface 25 of the cover transitions flush into the outer surface of the vehicle roof 9, hereinafter referred to as "outer surface 34 of the vehicle roof". The overmold 33 fills the intermediate space between the cover 20 and the outer pane 12 or the cover 20 and the vehicle roof 9 flush. Thus, very good aerodynamic properties, in particular for reducing air noises due to airflow, as well as an attractive external appearance can be obtained.

The inner part 24 and the outer part 23 of the cover 20 can be made of the same materials. Preferably, the inner part 24 and the outer part 23 are made of materials different from one another, wherein it is advantageous for the material of the outer part 23 to be selected with a view to good permeability for the sensor signals of the sensor 22; the material of the inner part 24, with a view to high strength of the module housing 18. For example, the outer part 23 is made of polycarbonate (PC), polymethyl methacrylate (PMMA), styrene acrylonitrile (SAN), and/or copolymers, block copolymers, or mixtures thereof. The inner part 24 is made, for example, of polycarbonate (PC), polyethylene (PE), polymethyl methacrylate (PMMA), polypropylene (PP), polystyrene, polybutadiene, polynitrile, polyester, polyurethane, polyacrylate, polyamide, polyethylene terephthalate (PET), polybutylene terephthalate (PBT), preferably acrylonitrile butadiene styrene (ABS), acrylonitrile styrene acrylester (ASA), acrylonitrile butadiene styrene polycarbonate (ABS+PC), PET+PC, PBT+PC, and/or copolymers, block copolymers, or mixtures thereof. The inner part 24 can additionally contain inorganic or organic fillers, preferably $SiO_2$, $Al_2O_3$, $TiO_2$, clay minerals, silicates, zeolites, glass fibers, carbon fibers, glass beads, organic fibers, and/or mixtures thereof. The fillers can further increase the stability of the cover 20. In addition, the fillers can reduce the polymeric material content and thus reduce the production costs of the sensor module 3. The material thickness of the outer part 23 is, for example, in the range from 2 to 4 mm, preferably 2.5 to 3.5 mm. The material thickness of the inner part 24 is, for example, in the range from 1 to 3 mm, preferably 1.5 to 2.5 mm.

Here, the base 19 serves, for example, as a carrier for the sensor 22, which is fixedly connected to the base 19. FIG. 2 depicts the vehicle window 1 in a typical installation position in which the sensor 22 is aligned such that the field of view 30 (beam path), cone-shaped here, for example, is aimed forward in the direction of travel, with a central beam 29 of the field of view 30 (beam path) parallel to the vehicle's longitudinal direction or the vehicle's longitudinal plane.

As depicted in FIG. 2, the cover 20 has, perpendicular to a plane of the pane main body 2 (e.g., a plane tangential to the pane main body 2 in the region of the cutout 4), a dome-like bulge 35 toward the external environment, wherein the cover 20 has, in the region of the window 31, a cover section 36 perpendicular to the longitudinal direction of the vehicle. The central beam 29 of the field of view 30 strikes the cover section 36 perpendicularly.

In principle, the sensor 22 can be any sensor for detecting objects in the external environment with or without transit time measurement of sensor signals (e.g., camera, radar sensor). Preferably, the sensor 22 is a LiDaR sensor, which can emit laser beam pulses and receive reflected laser beam pulses. This is illustrated in FIG. 2 by the two arrows pointing in opposite directions in the region of the field of view 30. When the outer part 23 is made of polycarbonate (PC), very good transmittance (at least 80%) for the IR laser beam pulses can be obtained. As a result of the perpendicular impact of the emitted and reflected laser beam pulses on the cover section 36, undesirable reflection/scattering as well as absorption of light in the cover 20 can be significantly reduced, yielding significant improvement of the efficiency of the sensor measurement. Preferably, the outer part 23 is made of black PC or PC that is opaque in the visible range; the inner part 24, of PC+ABS or PC+PET.

With the vehicle window 1 illustrated FIGS. 1 and 2, sensor module 3 can be advantageously integrated into the pane main body 2 as a prefabricated assembly such that the vehicle window 1 can be provided with an integrated sensor module 3 for installation in a motor vehicle without the need on the vehicle-side for a further mount for the sensor module 3, with the exception of the electrical connection.

In the exemplary embodiment of FIG. 2, a rearview mirror 37 is installed on the base 19 on the vehicle interior side.

In the following, various other embodiments of the vehicle window 1 or the vehicle window assembly 10 are described with reference to FIGS. 3 to 12. To avoid unnecessary repetition, only the differences relative to that embodiment to which reference is made are described; and, otherwise, reference is made to the statements there.

FIG. 3 depicts, using an analogous sectional representation, a variant of the vehicle window assembly 10 of FIG. 2.

In the embodiment of FIG. 3, the overmold 33 is not situated in the region between the cover 20 and the support surface 14 such that an intermediate space 38 remains there. Material can be saved by this measure.

FIG. 4 depicts, using an analogous sectional representation, a variant of the vehicle window assembly 10 of FIG. 3. In the embodiment of FIG. 4, the pane main body 2 is not a composite pane, but rather a single-pane safety glass, such as is used as a rear window in motor vehicles. In the region of the cutout 4, the module housing 18 is fastened to the inner surface 42 of the pane main body 2. On the pane main body side, the inner part 24 of the cover 20 extends in the region of the overhang 41 beyond the outer part 23 (e.g., in relation to a plane tangential to the pane main body in the region of the cutout 4). The inner part 24 overlaps the pane main body 2 on the inside and is glued thereto by a glue bead 32. On the pane main body side, there is no overmold 33. No rearview mirror 33 is attached to the base 19.

FIG. 5 depicts, using an analogous sectional representation, a variant of the vehicle window assembly 10 of FIG. 4. In the embodiment of FIG. 5, on the pane main body side, an overmold 33 is provided in the intermediate space between the pane main body 2 and the cover 20.

FIG. 6 depicts, using an analogous sectional representation, a variant of the vehicle window assembly 10 of FIG. 5. In the embodiment of FIG. 6, the vehicle roof 9 has no roof flange 17, but rather the module housing 18 or cover 20 (and the pane main body 2) are bonded to the underside 43 of the vehicle roof 9 by means of a glue bead 32. The cover 20 or the outer part 23 of the cover 20 has, for this purpose, a cover flange 39, which is overlapped with the vehicle roof 9. The intermediate space between the cover 20 and the vehicle roof 9 is filled by an overmold 33, creating a good seal against the external environment as well as a flush transition between the cover 20 and the vehicle roof 9.

FIG. 7 depicts, using an analogous sectional representation, a variant of the vehicle window assembly 10 of FIG. 5. In the embodiment of FIG. 7, the cover 20 is lengthened and forms a roof rim 40, which extends into the vehicle roof 9 in the longitudinal direction of the vehicle and is fastened to the vehicle roof 9, which is not shown in FIG. 7. As shown in FIGS. 8A and 8B, each of which illustrates an embodiment of the vehicle window assembly 10 of FIG. 7 in top view, the roof rim 40 can, for example, be implemented strip-shaped (FIG. 8A) or T-shaped (FIG. 8B).

FIG. 9 depicts, using an analogous sectional representation, another variant of the vehicle window assembly 10 of FIG. 2. In the embodiment of FIG. 9, the cover 20 is in one piece. For fastening the base 19 on the outer part 23, the outer part 23 has a circumferential support 28.

FIG. 10 depicts, using an analogous sectional representation, another variant of the vehicle window assembly 10 of FIG. 9. In the embodiment of FIG. 10, the cover 20 has, in the region of the field of view 30 of the sensor 22, a thinner material thickness than in the rest of the cover 20, forming a window 31 with improved transmittance for the signals of the sensor 22.

FIGS. 11 and 12 depict in top view (FIG. 11) and sectional representation (FIG. 12), respectively, another variant of the vehicle window 1 or vehicle window assembly 10, as illustrated in FIGS. 1 and 2. As can be seen from the top view of FIG. 11, the sensor module 3 is not inserted in a cutout 4 at the edge of the pane main body 2, but, rather, in a cutout 4 of the pane main body 2 formed in a non-edge inner region 45 of the pane main body 2, with the cutout 4 produced, for example, by milling or lasering. The cutout 4 is delimited exclusively by the pane main body 2, i.e., an edge surrounding the cutout 4 is formed by the pane main body 2. The cutout 4 is not adjacent an edge 6, 7, 8 of the vehicle window 1.

As depicted in the sectional view of FIG. 12, the pane main body 2 has, circumferentially, a back-offset of the outer pane 12 such that a support surface 14 for the module housing 18 surrounding the cutout 4 is formed. Applied circumferentially on the support surface 14 is a glue bead 32 by means of which the cover 20 or its inner part 24 is bonded to the inner pane 11. This embodiment of the vehicle window 1 can be advantageous in terms of the generation of stresses in the pane main body 2. In addition, one and the same adhesive or primer can be used when bonding the vehicle window 1 in the motor vehicle. It is not necessary to use materials specifically designed for plastic.

It follows from the statements above that the invention makes available an improved vehicle window with an integrated sensor module. The sensor module can be installed as a prefabricated assembly in a cutout of the pane main body such that the vehicle window with an integrated sensor module can be installed in the motor vehicle. The sensor module, in particular the material and the shape of the module housing in the region of the beam path of the sensor, can be designed specifically with regard to the efficiency of the sensor, wherein perpendicular impact of emitted and reflected sensors signal and high transmittance of the sensor signals is possible. The invention can be used particularly advantageously with the use of LiDaR sensors.

LIST OF REFERENCE CHARACTERS 1 vehicle window
2 pane main body
3 sensor module
4 cutout
5 field of view
6,6',6" roof-side vehicle window edge
7 bottom vehicle window edge
8 side vehicle window edge
9 vehicle roof
10 vehicle window assembly
11 inner pane
12 outer pane
13 intermediate layer
14 support surface
15 sheet-metal part
16 pane-side edge
17 roof flange
18 module housing
19 base
20 cover
21 hollow space
22 sensor
23 outer part
24 inner part
25 outer surface of the cover
26 inner surface of the cover
27 opening
28 support
29 central beam
30 field of view
31 window
32 glue bead
33 overmold
34 outer surface of the vehicle roof
35 bulge
36 cover section 37 rearview mirror
38 intermediate space
39 cover flange
40 roof rim
41 overhang
42 inner surface
43 under side
44 outer surface of the vehicle window
45 inner region

The invention claimed is:

1. A vehicle window with an integrated sensor module, which comprises:
a pane main body with a cutout,
a sensor module designed as a prefabricated assembly with a module housing, which forms a hollow space, in which at least one sensor is accommodated,
wherein the module housing forming the hollow space is inserted into the cutout and is fastened on the pane main body, wherein, together, an outer surface of the module housing and an outer surface of the pane main body form an outer surface of the vehicle window, and
wherein the module housing has a bulge shaped such that a housing section is situated in a field of view of the sensor, on which housing section a signal emitted by the sensor strikes with a deviation of a maximum of 10° from a perpendicular to the housing section.

2. The vehicle window according to claim 1, wherein the cutout is formed at an edge of the pane main body.

3. The vehicle window according to claim 1, wherein the cutout is formed in an inner region of the pane main body.

4. The vehicle window according to claim 1, wherein the module housing has a cover and a base fastened to the cover, which, together, form the hollow space for the sensor.

5. A vehicle window with an integrated sensor module, which comprises:
a pane main body with a cutout,
a sensor module designed as a prefabricated assembly with a module housing, which forms a hollow space, in which at least one sensor is accommodated,
wherein the module housing forming the hollow space is inserted into the cutout and is fastened on the pane main body, wherein, together, an outer surface of the module housing and an outer surface of the pane main body form an outer surface of the vehicle window,
wherein the module housing has a cover and a base fastened to the cover, which, together, form the hollow space for the sensor, and
wherein the cover comprises an outer part and an inner part designed in the form of an inner lining of the outer part, wherein the outer part and the inner part are made of different materials, and wherein the inner part has an opening situated in the field of view of the sensor.

6. A vehicle window with an integrated sensor module, which comprises:
a pane main body with a cutout,
a sensor module designed as a prefabricated assembly with a module housing, which forms a hollow space, in which at least one sensor is accommodated,
wherein the module housing forming the hollow space is inserted into the cutout and is fastened on the pane main body, wherein, together, an outer surface of the module housing and an outer surface of the pane main body form an outer surface of the vehicle window,
wherein the module housing has a cover and a base fastened to the cover, which, together, form the hollow space for the sensor, and
wherein the cover is formed in one piece and has, in a field of view of the sensor, a thinner wall thickness than outside the field of view of the sensor.

7. The vehicle window according to claim 4, wherein the cover is designed in the form of a roof rim.

8. A vehicle window with an integrated sensor module, which comprises:
a pane main body with a cutout,
a sensor module designed as a prefabricated assembly with a module housing, which forms a hollow space, in which at least one sensor is accommodated,
wherein the module housing forming the hollow space is inserted into the cutout and is fastened on the pane main body, wherein, together, an outer surface of the module housing and an outer surface of the pane main body form an outer surface of the vehicle window, and
wherein the pane main body comprises at least one outer pane and one inner pane that are joined to one another via at least one thermoplastic intermediate layer, wherein adjacent the cutout, the outer pane is set back relative to the inner pane, as a result of which a support surface is formed by the inner pane, wherein the module housing is fastened to the pane main body at the support surface.

9. The vehicle window according to claim 1, wherein the pane main body consists of a single pane, wherein the module housing is fastened to an inner surface of the single pane adjacent the cutout.

10. The vehicle window according to claim 1, wherein an intermediate space formed between the module housing and the pane main body is at least partially filled with a thermoplastic material.

11. A method for producing a vehicle window according to claim 1, comprising:
providing a pane main body having a cutout,
inserting the sensor module into the cutout and fastening the sensor module on the pane main body.

12. A method comprising utilizing the vehicle window according to claim 1 as a vehicle window in means of transportation for travel on land, in the air, or on water.

13. The method according to claim 12, wherein the vehicle window is a window pane in a rail vehicle or a motor vehicle.

14. The method according to claim 12, wherein the vehicle window is a windshield, a rear window, a side window, or a roof panel of a passenger car.

15. The vehicle window according to claim 5, wherein the cutout is formed at an edge of the pane main body.

16. The vehicle window according to claim 5, wherein the cutout is formed in an inner region of the pane main body.

17. The vehicle window according to claim 6, wherein the cutout is formed at an edge of the pane main body.

18. The vehicle window according to claim 6, wherein the cutout is formed in an inner region of the pane main body.

19. The vehicle window according to claim 8, wherein the cutout is formed at an edge of the pane main body.

20. The vehicle window according to claim 8, wherein the cutout is formed in an inner region of the pane main body.

* * * * *